United States Patent Office 3,123,583
Patented Mar. 3, 1964

3,123,583
MIXING PROCEDURE FOR COMPOSITIONS OF POLYMERS OF 1-OLEFINS AND NATURAL OR SYNTHETIC RUBBER
William S. Howard, Borger, and William T. Cooper, Phillips, Tex., assignors to Phillips Petroleum Company, a corporation of Delaware
No Drawing. Filed July 2, 1956, Ser. No. 595,114
6 Claims. (Cl. 260—45.5)

This invention relates to compositions of matter comprising olefin polymers and natural or synthetic rubber. More particularly, this invention relates to a method of blending these materials.

Application Serial No. 543,249, filed October 27, 1955, now abandoned, of R. V. Jones discloses new compositions, these being mixtures of specially prepared tacky and/or solid polymers of 1-olefins with natural or synthetic rubber.

We have discovered that compositions of the type disclosed by Jones are improved by a particular blending procedure. According to our operation, these materials are blended by first blending the olefin polymer with the rubber at a temperature above the softening point of the olefin polymer, temperatures in the range of 230 to 340° F. being generally used. This blending is continued until a homogeneous blend is obtained and, thereafter, the various compounding ingredients are added. The important feature of our invention resides in a final cold milling of the mixture at a temperature substantially below the softening point of the olefin polymer. The compounding ingredients can be added during the final milling as desired. Stocks which are subjected to this final cold milling operation subsequent to the initial hot milling are much more pliable, have lower compounded Mooney values, lower hysteresis, and much lower permeability to hydrogen than stocks in which all of the mixing is done at the higher temperature.

The following are objects of this invention.

An object of our invention is to provide blends of polymers of 1-olefins and natural or synthetic rubber. A further object of our invention is to provide blends of polyethylene and butadiene/styrene copolymers. A further object of our invention is to provide a method for producing such blends of improved physical properties.

Other objects and advantages of our invention will be apparent to one skilled in the art upon reading this disclosure.

It is believed that the invention, as set forth broadly above, can best be understood by a specific example disclosing operation in accordance with the improved method and comparing this to the method of the prior art. Therefore, the following example sets forth operation in accordance with what is believed to be the preferred method of the invention:

Example

Ethylene was polymerized in a continuous process using a 20 gallon reactor provided with a stirrer. Polymerization was effected in the presence of a chromium oxide-silica-alumina catalyst using isooctane as the solvent. The ethylene feed rate varied from 5.1 to 6.6 pounds per hour and the isooctane feed rate varied from 40 to 60 pounds per hour. Polymer concentration in the reactor ranged from 6.2 to 7 weight percent and catalyst concentration ranged from 0.46 to 0.6 weight percent. The temperature was 267–269° F. and the pressure was 420 p.s.i.g. The average molecular weight of the product (Staudinger method) was 46,000 and the softening point was approximately 260° F.

Six blends of the ethylene polymer with synthetic rubber (70/30 butadiene/styrene copolymer prepared by emulsion polymerization at 41° F. and having a Mooney value, ML–4, of 52) were prepared and compounded in accordance with the following gum stock formulation:

| | Parts by weight |
|---|---|
| Rubber | 100 |
| Ethylene polymer | 30 |
| Zinc oxide | 3 |
| Stearic acid | 2 |
| Flexamine [1] | 1 |
| Sulfur | 1.75 |
| Santocure [2] | 1.5 |

[1] Physical mixture containing 65 percent of a complex diarylamine-ketone reaction product and 35 percent of N,N'-diphenyl-p-phenylenediamine.
[2] N-cyclohexyl-2-benzothiazylsulfenamide.

The ethylene polymer was first incorporated into the rubber on a roll mill and the other ingredients, except for sulfur and Santocure, were added. Various combinations of hot and cold milling were employed but in all cases the ethylene polymer was incorporated into the rubber using a hot initial milling cycle. Hot milling was done at a roll temperature of 270° F. (steam fed to mill rolls at a pressure of 50 p.s.i.g.; approximate temperature, 296° F.) and for cold milling, tap water under 40 pounds pressure was fed to the mill rolls (rolls cool to the hand). During the second remill in all runs, the Santocure was added and then the sulfur.

The following table shows details of each milling procedure:

| Run Number | Milling time, minutes | | | | First remill time, minutes | | | | | Time for second remill, total minutes | |
|---|---|---|---|---|---|---|---|---|---|---|---|
| | Breakdown and ethylene polymer addition time, Hot Mill | Addition of chemicals and mixing | | Total | Time to band | | Cutting and blending | | Total | | |
| | | Hot Mill | Cold Mill | | Hot Mill | Cold Mill | Hot Mill | Cold Mill | | Hot Mill | Cold Mill |
| 1 | 11 | 7 | | 18 | | 1 | | 4 | 5 | | 5 |
| 2 | 11 | 7 | | 18 | 1 | | 4 | | 4 | 5 | |
| 3 | 11 | 7 | | 18 | 4 | | | 4 | 8 | | 5 |
| 4 | 11 | 7 | | 18 | 4 | | 4 | | 8 | 5 | |
| 5 | 11 | | 7 | 18 | 4 | | 4 | | 8 | | 5 |
| 6 | 11 | | 7 | 18 | 1 | | | 4 | 5 | | 5 |

The stocks were cured 30 minutes at 307° F. and physical properties were determined. The following results were obtained:

| Run Number | Mill | 1st Remill | 2nd Remill | Compression Set, percent | 80° F. | | | ΔT° F. | Resilience, percent | Flex Life, M [1] | Shore Hardness | Abrasion Loss, g. | Hydrogen Permeability [2] | MS 1½ at 212°F. |
|---|---|---|---|---|---|---|---|---|---|---|---|---|---|---|
| | | | | | 300 percent Modulus, p.s.i. | Tensile, p.s.i. | Elongation, percent | | | | | | | |
| 1 | Hot | Cold | Cold | 34.9 | 680 | 1,230 | 620 | 53.7 | 69.6 | 2.9 | 54 | 32.06 | 112 | 33 |
| 2 | do | do | Hot | 36.7 | 620 | 1,580 | 780 | 81.1 | 63.6 | 3.4 | 57 | 27.56 | 319 | 46.5 |
| 3 | do | Hot | Cold | 36.6 | 620 | 1,510 | 690 | 49.3 | 68.6 | 2.8 | 54 | 28.59 | 163 | 34 |
| 4 | do | do | Hot | 38.2 | 660 | 1,475 | 700 | 71.3 | 63.2 | 4.5 | 61 | 31.46 | 254 | 58.5 |
| 5 | Hot-Cold | do | Cold | 35.8 | 620 | 1,650 | 770 | 50.0 | 70.0 | 3.5 | 51.5 | 32.81 | | 33 |
| 6 | do | Cold | do | 31.8 | 625 | 1,420 | 690 | 54.1 | 67.9 | 1.1 | 56 | 26.38 | 163 | 40 |

OVEN AGED 24 HOURS AT 212° F.

| | | | | | | | | | | | | | | |
|---|---|---|---|---|---|---|---|---|---|---|---|---|---|---|
| 1 | Hot | Cold | Cold | | 1,030 | 1,260 | 395 | 31.1 | 77.3 | <0.1 | 61.5 | | | |
| 2 | do | do | Hot | | 960 | 1,250 | 440 | 43.6 | 72.3 | <0.1 | 63.5 | | | |
| 3 | do | Hot | Cold | | 960 | 1,190 | 390 | 31.4 | 78.2 | <0.1 | 62 | | | |
| 4 | do | do | Hot | | 1,000 | 1,250 | 415 | 43.6 | 70.5 | <0.1 | 67 | | | |
| 5 | Hot-Cold | do | Cold | | 1,020 | 1,230 | 375 | 30.1 | 79.6 | <0.1 | 60 | | | |
| 6 | do | Cold | do | | 1,020 | 1,260 | 405 | 36.5 | 76.2 | <0.1 | 62 | | | |

[1] Thousands of flexures to failure.
[2] Cc/day/square meter/cm. slab thickness at 0° C. and 1 atmosphere differential pressure.

These data show that the compositions in which a final cold milling step (second remill) was used had lower hysteresis, higher resilience, lower Shore hardness, lower compounded Mooney values; and much lower permeability to hydrogen than the samples which received hot second remills, i.e., products having better properties were obtained when the stocks were milled cold in the last milling step.

The invention, of course, is broader than this example and is applicable to various types of rubber and various polymers of 1-olefins.

Rubbery materials employed in the compositions of our invention include natural rubber and synthetic rubbery polymers of open-chain conjugated dienes having from four to eight carbon atoms exemplified by 1,3-butadiene; 2,3-dimethyl-1,3-butadiene; and the like, or the rubbery copolymers of these and similar conjugated dienes with each other or with copolymerizable monomeric material containing a single ethylenic linkage, such as styrene, alpha-methyl-styrene, methyl acrylate, methyl methacrylate, ethyl acrylate, ethyl methacrylate, 2-vinylpyridine, or the rubbery polymers or copolymers of such dienes as chloroprene and the like, or similar materials.

The tacky and/or solid olefin polymers are preferably obtained from 1-olefins of maximum chain length of eight carbon atoms and no branching nearer the double bond than the 4-position. For one type of these polymers, polymerization is effected in the presence of a chromium oxide, including hexavalent chromium, catalyst associated with at least one porous oxide selected from the group consisting of silica, alumina, zirconia, and thoria. Mixtures of such oxides can be used. The temperature used in carrying out the polymerization reaction can vary over a broad range but ordinarily is in the range between 150 and 450° F. The preferred range for propylene and higher olefins is 150 to 250° F., and that for ethylene is 275 to 375° F., when a fixed bed of catalyst is utilized. When a mobile catalyst is used, the optimum polymerization temperature range for ethylene is 200 to 350° F. Hydrocarbon diluents, preferably paraffins and/or cycloparaffins having from 3 to 12 carbon atoms per molecule, which are relatively inert, non-deleterious, and liquid under the reaction conditions, are employed. The pressure is preferably high enough to maintain all the components substantially completely in the liquid phase. A pressure of at least 100 to 300 p.s.i. is generally required, depending on the feed and the temperature, and a pressure of around 500 p.s.i. is to be preferred. The pressure can be as high as 700 p.s.i. or even higher, if desired. Preparation of these olefin polymers is more fully described in a copending application of Hogan and Banks, Serial No. 573,877, filed March 26, 1956, now Patent No. 2,825,721. Reference to this application is made for further details of the process and products.

The olefin polymers employed can be prepared using a single 1-olefin in the feed of two or more 1-olefins such as ethylene and propylene, ethylene and 1-butene, 1-butene and propylene, and the like. Polymers of the 1-olefins with up to 20 percent of a conjugated diene, such as 1,3-butadiene, are also applicable. Of the various polymers which are applicable, those prepared from ethylene are particularly valuable and frequently preferred.

Suitable polymers of olefins can also be obtained by polymerization of olefins in the presence of multicomponent catalysts comprising mixtures of aluminum trialkyls and compounds of metals of subgroups 4 to 6 of the periodic system, including thorium and uranium. Salts of titanium, zirconium, thorium, uranium and chromium are especially good. Mixtures of tetrachlorides, oxychlorides, or acetylacetonates of these metals of subgroups 4 to 6 with aluminum trialkyls rapidly convert ethylene to high molecular weight polyethylene, even at low pressures and temperatures, the reaction usually being carried out in a reaction medium comprising an aliphatic or hydroaromatic hydrocarbon such as pentane, hexane, cyclohexane, tetrahydronaphthalene, and the like. Specific catalyst systems for the polymerization of ethylene to high molecular weight polyethylene include triethylaluminum and titanium tetrachloride, tridodecylaluminum and titanium tetrachloride, triethylaluminum and zirconium acetylacetonate, triethylaluminum and tungsten hexachloride, triethylaluminum and $K_2TiF_6$, and triisobutylaluminum and zirconium tetrabutoxide.

Polyethylene prepared by these processes is distinguished from the products commercially available at the present time by a density of at least 0.94, usually 0.96 and above, and percentage crystallinity as determined by nuclear magnetic resonance at room temperature of at least 80, usually 90 and above.

Polymers employed in preparing the compositions herein described ordinarily have molecular weights in the range between 500 and 2,000,000 or higher. Molecular weights are determined either by boiling point elevation, which is applicable for the lower molecular weight materials, or by the Staudinger method, which is employed for calculation of molecular weights in the higher portion of the range. For the latter method, the inherent viscosity of a solution of 0.2 gram of the polymer in 50 cc. of tetralin at 130° C. is determined and the calculation is made as follows:

Molecular weight = $2.445 \times$ inherent viscosity $\times 10^4$

This is the method of Kemp and Peters, Ind. Eng. Chem., 35, 1108 (1943), and Dienes and Klemm, J. Applied Physics, 17, 458 (June 1946).

Properties of the polymer compositions vary from fairly rigid plastics to rubbery materials depending upon the type and amount of each component and whether or not the polymer blend is vulcanized. The amount of poly-1-olefin, e.g., ethylene polymer, incorporated into the rubbery material may vary from 0.5 to 99.5 parts by weight per 100 parts of the polymer blend, preferably 0.5 to 75 parts on the same basis. Gum stocks or fully compounded stocks can be pigmented as desired.

When it is desired to prepare compositions using the lower molecular weight olefin polymers, e.g., those having molecular weights below 30,000, they are generally employed in minor amounts with the major component being the rubbery material. For compositions of this type, 30 percent or less by weight, based on the total polymer composition, of the olefin polymer is frequently used. The higher molecular weight polymers, i.e., those having molecular weights in excess of 30,000 as determined by the Staudinger method hereinbefore described, may be employed in small or large proportions to give rubbery to plastic materials having excellent properties. Of the polymers of 1-olefins which are applicable, those having molecular weights in excess of 30,000 are most frequently preferred.

When operating in accordance with the process of this invention, the olefin polymer is incorporated into natural or synthetic rubber at a temperature which is high enough to allow efficient dispersion of the olefin polymer. Mixing is done by any suitable means such as in a Banbury mixer or on a roll mill and is continued for whatever time is necessary to form a homogeneous composition. A temperature which is at least 2 and preferably at least 5° F. above the softening point (adapted from Karrer et al., 1 & EC, Anal. Ed. 2, 96–99 (1930)), of the olefin polymer is ordinarily regarded as satisfactory for blending the materials. Temperatures in the range between 260 and 340° F. are generally satisfactory for polyethylene. The broader range of 230 to 340° F. is used for polymers of other 1-olefins including copolymers such as propylene/ethylene copolymers. The temperature is adjusted to suit the particular materials being blended i.e., it is regulated so that a homogeneous composition can be obtained in a relatively short time. Usually only a few minutes is required for the formation of a homogeneous blend. The time will depend on various factors such as the size of the mill, type of mill, size of batch, and the like. A period in the range between 1 and 15 minutes is ordinarily sufficient for the production of a homogeneous blend but a longer time might be required in some instances.

Subsequent to the initial hot milling cycle, various compounding ingredients are incorporated into the composition. They may be added on either the hot or cold mill. One method comprises addition of compounding ingredients, except the sulfur and vulcanization accelerator, to the composition at the temperature of the initial mixing cycle, removal of the material from the hot mill, and finally milling on a cold mill, i.e., at a temperature substantially below the softening point of the olefin polymer. The sulfur and vulcanization accelerator are preferably added to the composition during the cold milling portion of the milling steps and mixing is continued until a homogeneous product is obtained but they can be added during the hot milling portion of the milling steps if the temperature is carefully controlled and the milling time is maintained at a minimum. An alternative method of operation comprises addition of all compounding ingredients on a cold mill.

The cold milling portion of the process is carried out at a temperature usually below 150° F., preferably below 130° F. When a roll mill is employed, banding of the stock on the mill rolls may be all that is necessary but generally better dispersion of all compounding ingredients is accomplished with two remills. The milling time on the cold mill will generally vary in the range between 1 and 15 minutes, the time being determined by the size and type of mill and size of the batch. A milling period of even less than 1 minute may be adequate in some instances and in other cases periods longer than 15 minutes might be required. Incorporation of the sulfur and vulcanization accelerator is often accomplished during a remilling step, preferably on a cold mill.

Stocks which are given a final cold milling treatment subsequent to one or more hot milling steps are much more pliable, have a lower Mooney value, lower hysteresis, and are much less permeable to hydrogen than stocks which receive the hot remill for the final milling step.

Rubbery materials prepared in accordance with the process of this invention are suitable for the many uses where rubber is employed. Compositions prepared with high molecular weight polymers of 1-olefins are applicable for shoe sole stocks and heels. The reduction in air permeability of rubber stocks makes them valuable for use in the fabrication of tubeless tires. Thermoplastic molding compositions suitable for manufacturing various types of molded objects, extruded materials such as pipes, wire coatings, etc. may be obtained. The presence of a rubbery material in the olefin polymer, even in relatively small quantities, gives thermoplastic stocks which are easier to extrude and which have good impact strength.

As many possible embodiments may be made of this invention without departing from the scope thereof, it is to be understood that all matter herein set forth is to be interpreted as illustrative and not as unduly limiting.

We claim:

1. A method of preparing a vulcanized blend of (1) polyethylene having a density in the range of 0.94 to 0.96 and (2) a rubbery polymer selected from the group consisting of homopolymers of conjugated dienes containing 4 to 8 carbon atoms and copolymers of conjugated dienes containing 4 to 8 carbon atoms with a monomer selected from the group consisting of styrene, alpha-methylstyrene, methyl acrylate, methyl methacrylate, ethyl acrylate, ethyl methacrylate and 2-vinylpyridine comprising blending said polyethylene with said rubbery polymer at a temperature above the softening point of said polyethylene and, subsequently and as the final milling operation, milling said blend at a temperature substantially below the softening point of said polyethylene until a homogeneous compoistion results, compounding ingredients being added during at least one of said blending and milling operations and vulcanizing said blend.

2. The composition produced by the method of claim 1, said composition having a lower Mooney value, lower hysteresis, and being less permeable to hydrogen than a composition of the same ingredients made without said final milling operation at a temperature substantially below the softening point of the polyethylene.

3. A method of preparing a vulcanized blend of (1) polyethylene having a density in the range of 0.94 to 0.96 and (2) a sulfur vulcanizable rubbery butadiene/styrene copolymer, comprising, blending said polyethylene with said rubbery polymer at a temperature above the softening point of said polyethylene and, subsequently and as the final milling operation, milling said blend at a temperature substantially below the softening point of said polyethylene until a homogeneous composition results, compounding ingredients being added during at least one of said blending and milling operations and vulcanizing said blend.

4. The process of claim 3 wherein said blending is carried out at a temperature in the range of 230 to 340° F. and at least 2° F. above the softening point of the polyethylene and said final milling at a temperature below 150° F.

5. The method of preparing a vulcanized blend of (1) polyethylene having a density in the range of 0.94 to 0.96 and (2) a sulfur vulcanizable rubbery butadiene/styrene copolymer comprising, blending said polyethylene with said rubbery polymer at a temperature above the softening point of said polyethylene, incorporating at least a portion of the compounding ingredients in the resulting blend, milling said blend at a temperature substantially below the softening point of said polyethylene until a homogeneous composition results, compounding ingredients not previously added being incorporated during this final milling operation and vulcanizing said blend, said blend having low hydrogen permeability.

6. The process of claim 5 wherein said blending is carried out at a temperature in the range of 230 to 340° F. and at least 2° F. above the softening point of the polyethylene and said final milling at a temperature below 150° F.

References Cited in the file of this patent

UNITED STATES PATENTS

| | | |
|---|---|---|
| 2,436,842 | Warner et al. | Mar. 2, 1948 |
| 2,631,954 | Bright | Mar. 17, 1953 |
| 2,691,647 | Field et al. | Oct. 12, 1954 |
| 2,832,748 | Safford et al. | Apr. 29, 1958 |
| 2,838,854 | Dosmann | June 17, 1958 |

FOREIGN PATENTS

| | | |
|---|---|---|
| 151,101 | Australia | Apr. 27, 1953 |

OTHER REFERENCES

"Modern Plastics," volume 33, September 1955, pages 85–92, 210–214.

Stern: "Rubber, Natural and Synthetic," page 89, 1954, Maclaren & Sons.

Conant et al.: "The Chemistry of Organic Compounds," page 58, 1959, Macmillan Company, New York.